United States Patent
Jung et al.

(10) Patent No.: US 10,630,973 B2
(45) Date of Patent: Apr. 21, 2020

(54) GENERATION AND ENCODING OF RESIDUAL INTEGRAL IMAGES

(71) Applicant: Orange, Paris (FR)

(72) Inventors: Joel Jung, Le Mesnil Saint Denis (FR); Antoine Dricot, Larousse (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 15/501,172

(22) PCT Filed: Sep. 21, 2015

(86) PCT No.: PCT/FR2015/052525
§ 371 (c)(1),
(2) Date: Feb. 1, 2017

(87) PCT Pub. No.: WO2016/046483
PCT Pub. Date: Mar. 31, 2016

(65) Prior Publication Data
US 2017/0230654 A1    Aug. 10, 2017

(30) Foreign Application Priority Data
Sep. 22, 2014  (FR) ..................... 14 58918

(51) Int. Cl.
*H04N 19/132* (2014.01)
*H04N 19/102* (2014.01)
(Continued)

(52) U.S. Cl.
CPC ......... *H04N 19/102* (2014.11); *H04N 19/124* (2014.11); *H04N 19/147* (2014.11); *H04N 19/172* (2014.11); *H04N 19/597* (2014.11)

(58) Field of Classification Search
CPC .. H04N 19/102; H04N 19/124; H04N 19/172; H04N 19/597
(Continued)

(56) References Cited

U.S. PATENT DOCUMENTS 6,476,805 B1    11/2002  Shum et al.
9,918,107 B2    3/2018   Shi et al.
(Continued)

FOREIGN PATENT DOCUMENTS

WO      2012150407 A1    8/2012
WO   WO 2013156718      * 10/2013  ............... H04N 7/26

OTHER PUBLICATIONS

Yoo et al., "Enhanced compression of integral images by combined use of residual images and MPEG-4 algorithm in three-dimensional integral imaging", Optics Communications, 2011.*
(Continued)

*Primary Examiner* — James T Boylan
(74) *Attorney, Agent, or Firm* — Haverstock & Owens LLP

(57) ABSTRACT

The invention concerns the encoding of at least one current integral image ($II_j$) captured by an image capture device, comprising the steps consisting of: —decomposing (C1) the current integral image into at least one frame (Vu) representing a given perspective of a scene and, from at least one image capturing parameter associated with the image capture device, —encoding (C2) said at least one frame, —decoding (C4) said at least one frame, —recomposing (C5) the current integral image from said at least one decoded frame by applying an inverse decomposition of said decomposition of the integral image and from said at least one image capturing parameter associated with the image capture device, said encoding method being characterised in that it implements the steps consisting of: —determining (C6) a residual integral image by comparing said at least one current integral image with said recomposed integral image, —encoding (C7) the data associated with the residual integral image and said at least one image capturing parameter associated with the image capture device.

20 Claims, 7 Drawing Sheets

(51) Int. Cl.
*H04N 19/597* (2014.01)
*H04N 19/172* (2014.01)
*H04N 19/124* (2014.01)
*H04N 19/147* (2014.01)

(58) Field of Classification Search
USPC .................................................. 375/240.12
See application file for complete search history.

(56) References Cited

U.S. PATENT DOCUMENTS

| | | | |
|---|---|---|---|
| 2014/0168362 A1* | 6/2014 | Hannuksela | H04N 13/161 348/43 |
| 2014/0198842 A1* | 7/2014 | He | H04N 19/597 375/240.03 |
| 2015/0201176 A1* | 7/2015 | Graziosi | H04N 13/111 348/43 |

OTHER PUBLICATIONS

Graziosi et al. "Compression for Full-Parallax Light Field Displays" Proceedings of SPIE, Feb. 2014.*
Graziosi et al. "Depth assisted compression of full parallax light fields" 2015.*
Magnor et al. "Data Compression for Light-Field Rendering" IEEE, 2000.*
Piao et al. Sub-sampling elemental images for Integral Imaging Compression,IEEE, 2010.*
Yan et al. "Integral image compression based on optical chacteristic" IET Computer Vision, Mar. 24, 2010.*
Cheol-Hwa Yoo et al., "Enhanced Compression of Integral Images by Combined use of residual Images and MPEG-4 Algorithm in Three-Dimensional Integral Imaging", Optics Communications, North-Holland, vol. 284, No. 20, Jun. 13, 2011, XP028258970, ISN: 0030-4018.
Agooun Amar et al., "Acquisition Processing and Coding of 3D Holoscopic Content for Immersive Video Systems", 2013 3DTV Vision Beyond Depth , Oct. 7, 2013, pp. 1-4, XP032527561.
Enclosed please find the French Search Report for the French Application 1458918.
Enclosed please find the International Search Report PCT/FR2015/052525 application.

* cited by examiner

GENERATION AND ENCODING OF RESIDUAL INTEGRAL IMAGES

FIELD OF THE INVENTION

The present invention relates generally to the field of image processing and more specifically to the coding and decoding of integral images and sequences of integral images.

The invention may notably, although not exclusively, be applied to the video coding employed in present-day AVC and HEVC video coders and their extensions (MVC, 3D-AVC, MV-HEVC, 3D-HEVC, etc.) and to the corresponding video decoding.

PRIOR ART

Integral imaging is a technique that consists in representing images in relief. It is considered particularly promising in the development of 3D television, notably because it proposes, rather than a stereoscopic visualization of the images, a total parallax.

An integral image is conventionally composed of different elementary images also termed micro-images each of which represents a different perspective of a scene in three dimensions. An integral image is acquired by means of an image capture device that includes a video camera and a lens array that is disposed between the scene in three dimensions and the video camera.

Compressing an integral image therefore amounts to compressing all of the micro-images that constitute it.

Despite the attractions of a technique of this kind, there are difficulties in the practical implementation of integral imaging systems. For example, if some applications impose a high resolution of the integral image and a large number of points of view, it is necessary to increase not only the size of each micro-image constituting that integral image but also the number of micro-images thereof. This results in much too large an increase in the size of the integral image constructed in this way. Thus if the integral image must be coded, there is a high volume of information to be compressed and performance in terms of compression of the integral image is poor.

Two different coding methods are generally proposed for compressing an integral image.

The first coding method consists in applying coding in two dimensions (2D) to the integral image as such. To this end, the characteristics of a conventional 2D codec are modified to match the particular structure of the integral images. According to a first example, in the documents "Compression of 3D Integral Images Using 3D Wavelet Transform", Aggoun, Journal of Display Technologies, November 2011, and WO 2013156718 A1, it is proposed to code an integral image by applying directly thereto a discrete wavelet transform DWT followed by coding of the coefficients obtained following that transform. According to a second example, in the document "New HEVC prediction modes for 3D holoscopic video coding", Conti, Nunes, Soares, ICIP 2012, Orlando, October 2012, there are proposed new prediction modes for coding an integral image by modes of a 2D video coder.

The major drawback of a first method of the above kind lies in the fact that, the resolution of the integral image being very high, it is difficult to code. This first method obliges compression of a high volume of information, which results in poor performance.

The second coding method consists in decomposing the integral image into a plurality of views each of which represents a 3D scene from a specific visualization angular position. Each pixel or pixel zone associated with the view in question registers information relating to the light rays reflected by an object in perspective in the scene in one and the same direction. 3D coding is then applied to the views obtained in this way. For example, in the documents "3D Holoscopic video coding using MVC", Dick, Almeida, Soares, Nunes, EUROCON 2011 and "Efficient compression method for integral images using multi-view video coding", S. Shi, P. Gioia, and G. Madec, ICIP 2011, Brussels, Belgium, September 2011, a series of views of an integral image may be considered as a multi-view image (Multi View Video) of the scene and because of this a sequence of integral images can be decomposed into a multi-view video sequence. Said series of views can therefore be compressed using a standard coding technique such as the MVC technique (from the English "Multi-view coding").

A drawback of this second coding method is that its practical application imposes a limitation on the number of views to be coded by the MVC technique. Moreover, to reconstruct the integral image in its entirety, a high resolution is required for the views or a large number of views is necessary because those views must contain all of the angular information contained in the integral image which is afterwards reconstructed at the decoder.

OBJECT AND SUMMARY OF THE INVENTION

One object of the invention is to remedy the drawbacks of the prior art referred to above.

To this end, one object of the present invention concerns a method of coding at least one current integral image captured by an image capture device, including the following steps:
- decomposing the current integral image into at least one view representing a given perspective of a scene and from at least one image capture parameter associated with the image capture device,
- coding said at least one view,
- decoding said at least one view,
- recomposing the current integral image from said at least one decoded view by application of an inverse decomposition of the decomposition of the integral image and from said at least one image capture parameter associated with the image capture device,
- determining a residual integral image by comparison of said at least one current integral image with said recomposed integral image,
- coding the data associated with the residual integral image and said at least one image capture parameter associated with the image capture device.

Accordingly, even if the view or views obtained after decomposition of the current integral image have a low resolution, which makes it possible to code a smaller quantity of angular information, the data of the current integral image that is lost after 3D coding of this kind is introduced into the residual integral image that is determined and the pixel values of which are generally low, and therefore of relatively low cost to code.

The coding of an integral image in accordance with the invention is therefore much less costly in terms of the quantity of data to be coded than the prior art coding methods described above.

As is known in itself, the recomposition of an integral image necessitates the knowledge of at least one image capture parameter associated with the image capture device such as, for example, the resolution of the micro-images constituting the integral image and the number of micro-images.

The various embodiments and features referred to hereinafter may be added independently or in combination with one another to the features of the coding method defined above.

According to one particular embodiment, the coding method includes:
   a step of generating a first data signal containing data coming from the coding of the at least one view, and
   a step of generating a second data signal containing the data associated with the coded residual integral image,
said at least one image capture parameter associated with the image capture device being contained either in the first signal or in the second signal or in another data signal to be generated.

Given the smaller quantity of coded data obtained from the coding method according to the invention, this kind of feature advantageously makes it possible to reduce significantly the cost of signaling such coded data intended for a decoder.

According to another particular embodiment, the number and the position of the views to be coded of the current integral image are selected as being those that optimize a predetermined coding performance criterion.

A feature of this kind makes it possible to test a plurality of possibilities for coding a current integral image according to the coding method according to the invention with a single view, two views, three views, etc., and then, depending on the coding context, to select the coding that represents the best compromise between a smaller amount of data to be coded that is likely to be obtained and a high quality of rendering of the reconstituted integral image.

According to another particular embodiment, the number and the position of the views of the current integral image selected are selected as being those that minimize the quantity of data associated with the residual integral image.

A feature of this kind makes it possible to test a plurality of possibilities for coding a current integral image according to the coding method according to the invention with a single view, two views, three views, etc., and then to select the coding for which the pixels of the determined residual integral image are the closest to a predetermined value, for example zero.

According to another particular embodiment, there is selection of a value of a first quantization parameter to be applied during the step of coding said at least one view and selection of a value of a second quantization parameter to be applied during the step of coding the data associated with the residual integral image, said values being selected as optimizing a predetermined coding performance criterion.

A feature of this kind makes it possible to test a plurality of different quantization steps when coding said at least one view and the data associated with the residual integral image and, depending on the coding context, to arrive at a compromise between the greater or lesser severity (i.e. higher or lower quantization step size) with which said data will be coded and a higher or lower quality of rendering of the reconstituted integral image.

Accordingly, depending on the coding context, a compromise of this kind will instead be applied to the step of coding said at least one view or instead to the step of coding the data associated with the residual integral image.

According to another particular embodiment, the coding method according to the invention further includes an image transformation step that is applied:
   between the step of decomposition of the current integral image into said at least one view and the step of coding said at least one view, and/or
   between the step of decoding said at least one view and the step of recomposition of the current integral image, and/or
   between the step of recomposition of the current integral image and the step of determination of the residual integral image.

The advantage of transformation of this kind is to reduce the quantity of data of the residual integral image to be coded. This implies obtaining a recomposed integral image that best resembles the original integral image and therefore making efficacious recomposition possible.

Image transformation of this kind consists for example in filtering, image smoothing or even geometric image transformation (expansion, erosion, rotation, symmetry, etc.) that makes it possible to compensate the loss of information introduced by decomposition of the current integral image into at least one view.

According to another particular embodiment, the aforementioned image transformation step is implemented using a transformation parameter that is selected as optimizing a predetermined coding performance criterion or as minimizing the quantity of data associated with the residual integral image.

The invention also concerns a device for coding at least one current integral image captured by an image capture device, including:
   a first processing module for decomposing the current integral image into at least one view representing a given perspective of a scene and from at least one image capture parameter associated with the image capture device,
   a first coding module for coding said at least one view,
   a decoding module for decoding said at least one view,
   a second processing module for recomposing the current integral image from said decoded view by application of an inverse decomposition of said decomposition of the integral image and from said at least one image capture parameter associated with the image capture device,
   a calculation module for determining a residual integral image by comparison of said at least one current integral image with said recomposed integral image,
   a second coding module for coding the data associated with the residual integral image and said at least one image capture parameter associated with the image capture device.

A coding device of this kind is notably able to implement the aforementioned coding method.

The invention also concerns a method of decoding a data signal representing at least one current integral image acquired by an image capture device and that has previously been coded, said method including the following steps:
   identifying in the data signal at least one image capture parameter associated with the image capture device,
   decoding at least one view of the current integral image from said at least one image capture parameter that has been identified, said at least one view representing a given perspective of a scene,
   recomposing an integral image as predictor of the current integral image from said at least one decoded view and from said at least one image capture parameter associated with the image capture device, decoding coded data representing the difference between said at least one current integral image and the recomposed integral image, reconstructing the current integral image from said recomposed integral image and decoded data representing said difference.

Given the reduced quantity of coded data obtained from the coding method according to the invention and therefore the reduced cost of signaling that coded data to the decoder, a feature of this kind advantageously makes it possible to decode a smaller quantity of data than in the prior art with an integral image reconstruction quality that proves satisfactory. The result of this is more efficient decoding.

The various embodiments or features referred to hereinafter may be added independently or in combination with one another to the features of the decoding method defined above.

According to one particular embodiment, the step of recomposition of the current integral image is implemented using a position parameter of said at least one decoded view in the current integral image to be decoded, a position parameter of this kind being predetermined or read in the data signal.

If the position parameter of said at least one view is predetermined, this information is known both when coding and when decoding. The advantage of this feature is to optimize the reduction of the coding cost and to avoid indicating the position parameter in the data signal, which makes it possible to optimize the signaling cost.

If the position parameter of said at least one view is identified in the data signal, that means that information of this kind has necessarily been selected optimally at the coding stage, which makes it possible to optimize performance in terms of decoding the current integral image.

According to another particular embodiment:
the step of decoding said at least one view includes the execution of a dequantization step based on a first quantization parameter the value of which is identified in the data signal,
the step of decoding the coded data representing the difference between said at least one current integral image and the recomposed integral image includes the execution of a dequantization step based on a second quantization parameter the value of which is identified in the data signal.

According to another particular embodiment, the decoding method further includes a step of image transformation based on a transformation parameter that is predetermined or read in the data signal, a transformation step of this kind being applied:
between the step of decoding said at least one view and the step of recomposition of the current integral image as predictor of the current integral image, and/or
between the step of recomposition of the current integral image as predictor of the current integral image and the step of reconstruction of the current integral image.

The invention also concerns a device for decoding a data signal representing at least one current integral image acquired by an image capture device and that has previously been coded, the decoding device including:
an analysis module for identifying in the data signal at least one image capture parameter associated with the image capture device,
a first decoding module for decoding at least one view of the current integral image based on said at least one image capture parameter that has been identified, said at least one view representing a given perspective of a scene,
a processing module for recomposing an integral image as predictor of the current integral image from said decoded view and from said at least one image capture parameter associated with the image capture device,
a second decoding module for decoding coded data representing the difference between said at least one current integral image and the recomposed integral image,
a reconstruction module for reconstructing the current integral image from said recomposed integral image and decoded data representing said difference.

The invention further concerns a computer program including instructions for executing either one of the coding and decoding methods according to the invention when it is executed on a computer.

This program may use any programming language and take the form of source code, object code or intermediate code between source code and object code, such as a partially compiled form, or any other desirable form.

The invention is also directed to a computer-readable storage medium on which is stored a computer program, this program including instructions for executing the coding or decoding method according to the invention as described above.

The invention is also directed to a computer-readable storage medium on which is stored a computer program, this program including instructions for executing the coding or decoding method according to the invention as described above.

The storage medium may be any entity or device capable of storing the program. For example, the medium may include storage means such as a ROM, for example a CD ROM or a microelectronic circuit ROM, or magnetic storage means, for example a USB key or a hard disk.

Moreover, the storage medium may be a transmissible medium such as an electrical or optical signal that can be routed via an electrical or optical cable, by radio or by other means. The program according to the invention may in particular be downloaded over an Internet type network.

Alternatively, the storage medium may be an integrated circuit in which the program is incorporated, the circuit being adapted to execute or to be used in the execution of the aforementioned coding or decoding method.

BRIEF DESCRIPTION OF THE DRAWINGS

Other features and advantages will become apparent on reading the description of a preferred embodiment with reference to the figures, in which.

DETAILED DESCRIPTION OF THE CODING PART

One embodiment of the invention will now be described in which the coding method according to the invention is used to code an integral image or a sequence of integral images according to a binary signal close to that produced by coding employed in a coder conforming to any present or future video coding standard.

In this embodiment, the coding method according to the invention is implemented in software or hardware by modification of such a coder, for example. The coding method according to the invention is represented in the form of an algorithm including steps C1 to C8 as shown in FIG. 1.

Figure 2:
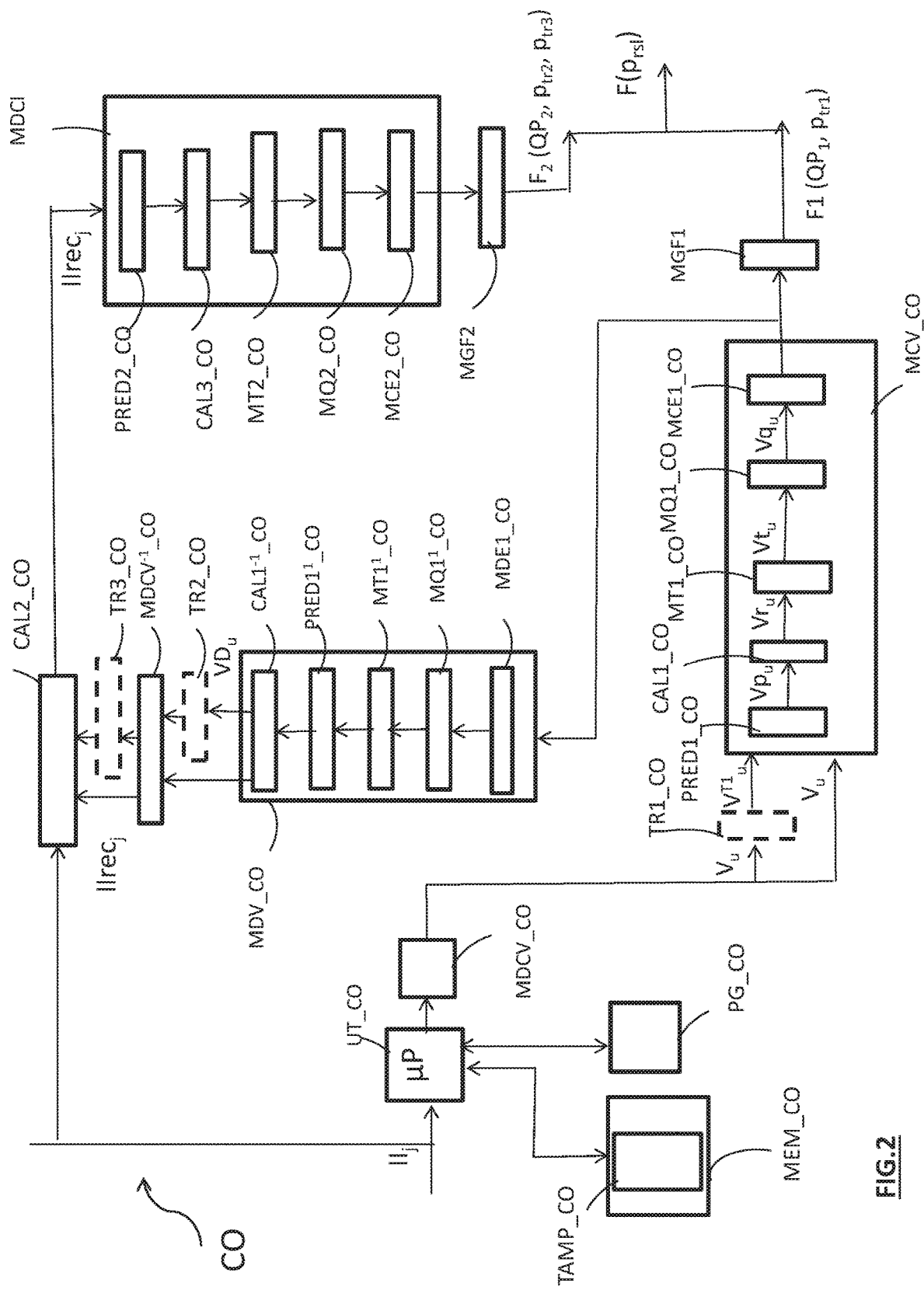
FIG. 2 represents one embodiment of a coding device according to the invention.

According to the embodiment of the invention, the coding method according to the invention is implemented in a coding device or coder CO as represented in FIG. 2.

As shown in FIG. 2, a coder of this kind includes a memory MEM_CO including a buffer memory TAMP_CO, a processor unit UT_CO including for example a microprocessor µP and controlled by a computer program PG_CO that implements the coding method according to the invention. At initialization time, the code instructions of the computer program PG_CO are for example loaded into a RAM (not shown) before being executed by the processor of the processor unit UT_CO.

Figure 1:
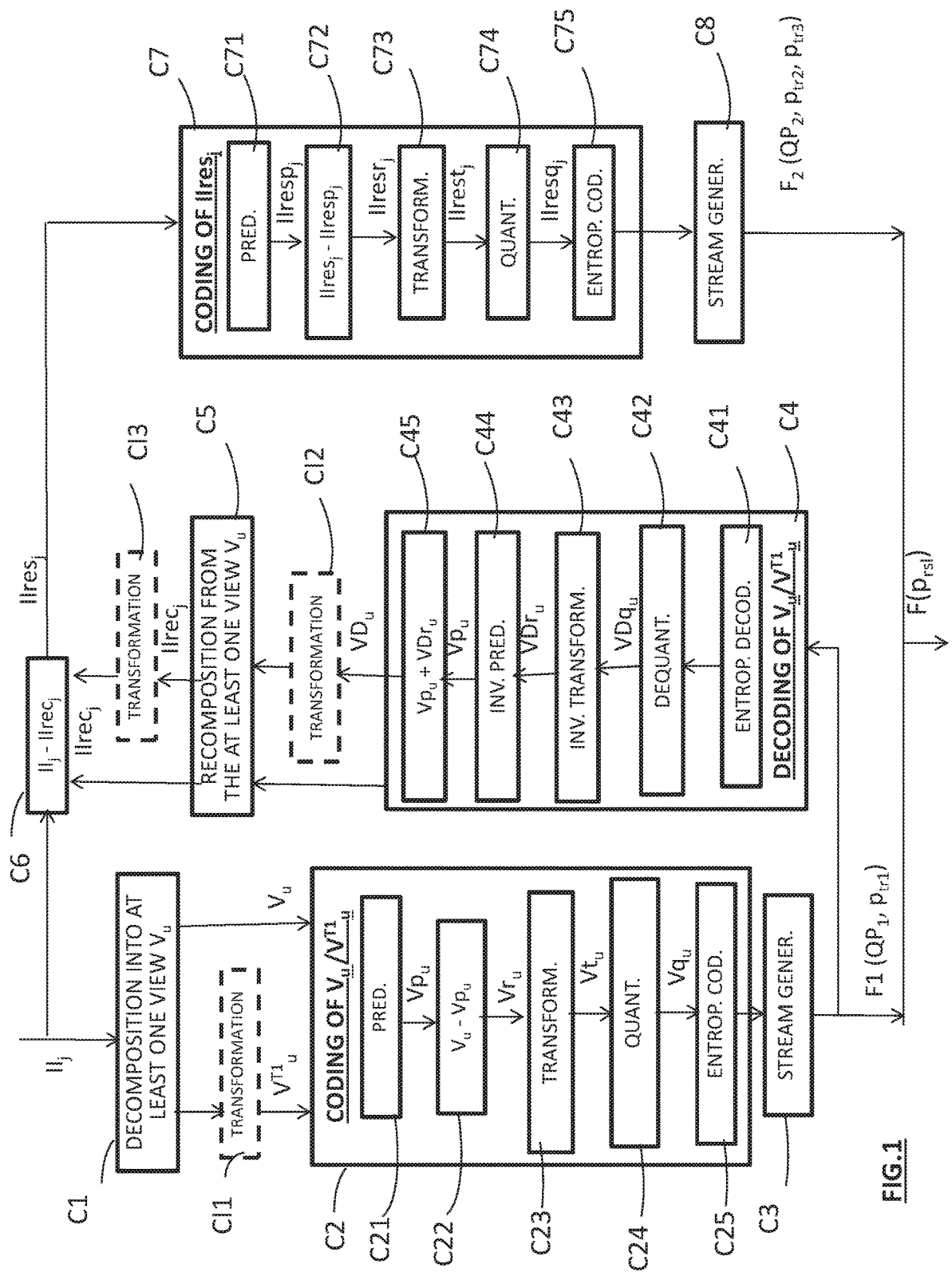
FIG. 1 represents the steps of the coding method according to one embodiment of the invention.

The coding method as represented in FIG. 1 is applied to any current integral image $II_j$ that is fixed or part of a sequence of integral images $II_1, \ldots, II_j, \ldots, II_M$ ($1 \leq j \leq M$) to be coded.

Figures 3A, 3B:
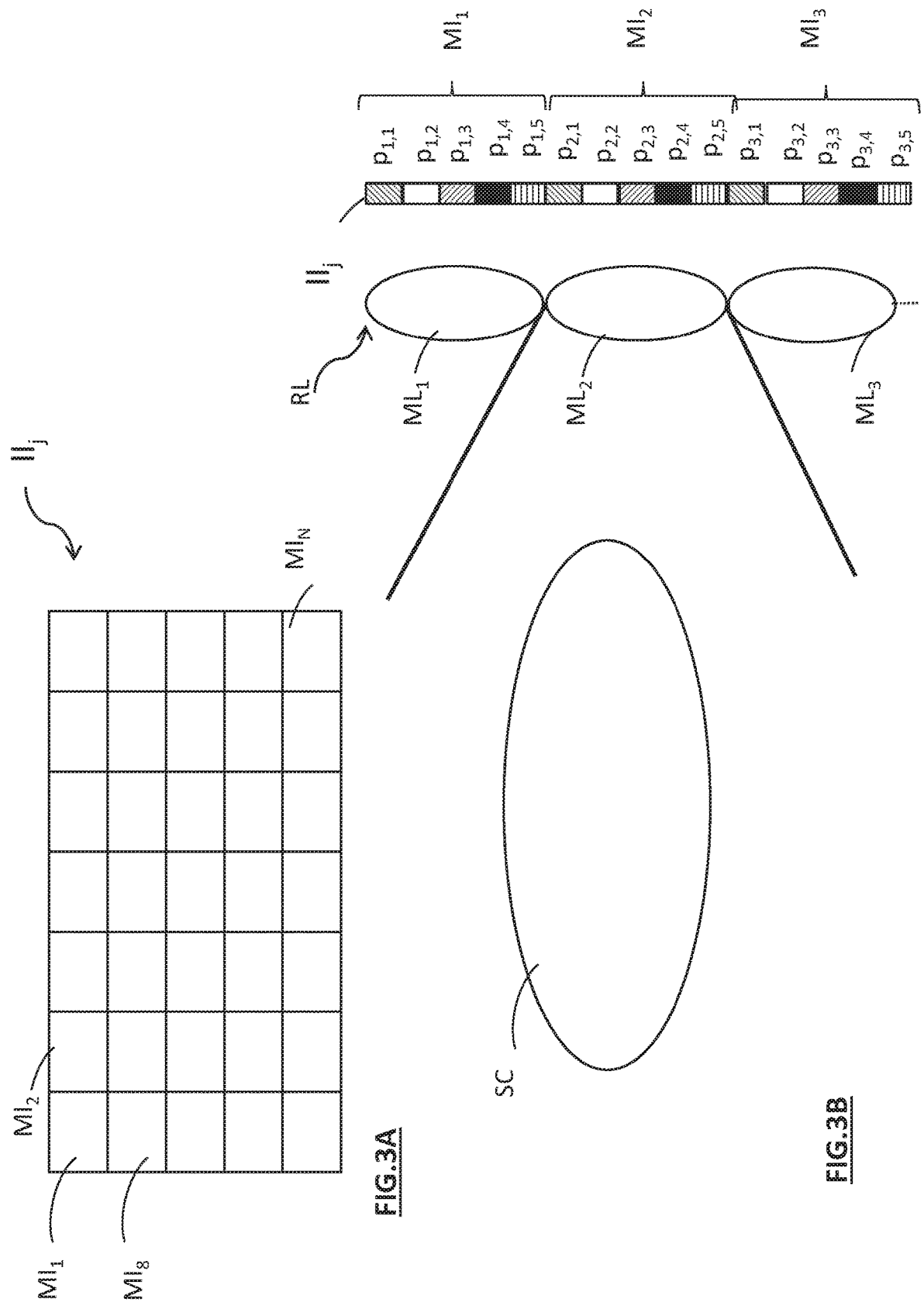
FIG. 3A represents one example of an integral image.
FIG. 3B represents one example of integral image acquisition by means of an image capture device.

As represented in FIG. 3A, a current integral image $II_j$ is composed of different elementary images also termed micro-images $MI_1, MI_2, \ldots, MI_N$. For simplicity, the micro-images represented all have the same dimensions and the same resolution. It goes without saying that the invention also applies to micro-images with different dimensions and respective different resolutions.

As represented in FIG. 3B, the current integral image $II_j$ is conventionally acquired by means of an image capture device that includes a video camera (not shown) and a lens array RL that is disposed between a scene SC in three dimensions and the video camera.

The lens array RL comprises a plurality of microlenses, of which only three microlenses $ML_1, ML_2, ML_3$ are represented in FIG. 3B. In the example represented, the microlenses are all identical. The integral image $II_j$ is then reproduced on a screen (not shown) that is disposed in the focal plane of the aforementioned microlenses. In the manner known in itself, each micro-image of the integral image $II_j$ contains a plurality of pixels of different colors, each of those pixels representing a given perspective of the scene SC. In the example represented, each micro-image has the same size as a microlens and therefore only three micro-images $MI_1, MI_2$ and $MI_3$ are represented, respectively in corresponding relationship with the three microlenses $ML_1, ML_2, ML_3$. In the example represented, each micro-image is composed for example of five pixels of different colors. A given micro-image $MI_i$ ($1 \leq i \leq N$) contains five pixels $P_{i,1}, P_{i,2}, P_{i,3}, P_{i,4}, P_{i,5}$.

During the acquisition of the integral image $II_j$, light rays coming from the scene SC pass through each microlens $ML_1, ML_2, ML_3$ and then impinge on the pixels of each cell of the sensor, in the focal plane of said microlenses. Given the particular configuration of the lens array RL and the matrix of pixels constituting the screen, the light rays:

impinge at a first angle of incidence on the pixels $P_{1,1}, P_{2,1}, P_{3,1}$, impinge at a second angle of incidence on the pixels $P_{1,2}, P_{2,2}, P_{3,2}$, impinge at a third angle of incidence on the pixels $P_{1,3}, P_{2,3}, P_{3,3}$, impinge at a fourth angle of incidence on the pixels $P_{1,4}, P_{2,4}, P_{3,4}$, impinge at a fifth angle of incidence on the pixels $P_{1,5}, P_{2,5}, P_{3,5}$.

In the manner known in itself, each angle of incidence corresponds to a particular visualization angle according to which an observer has the possibility of visualizing the scene SC. The values of these angles are contained within the characteristic angular range of the microlens concerned. One such angular range, corresponding for example to that of the microlens $ML_2$, is represented in solid bold line in FIG. 3B by way of illustration.

Depending on the required coding context, the image capture device is configured to adapt the number of microlenses that constitute it and their resolution. Accordingly, any integral image acquired by an image capture device of this kind is characterized by a given number of micro-images and a given resolution for each of those micro-images, these two numbers constituting parameters associated with the image capture device.

During a step C1 represented in FIG. 1, the current integral image $II_j$ is decomposed into at least one view $V_u$ based on said plurality of micro-images constituting the current integral image $II_j$ and the resolution thereof.

The step C1 is implemented by a processing software module MDCV_CO as represented in FIG. 2.

According to a first example, if each of the micro-images of the current integral image $II_j$ contains K pixels of different colors, the current integral image $II_j$ is decomposed into:

a view that contains the first pixel of the micro-image $MI_1$, the first pixel of the micro-image $MI_2$, ..., the first pixel of the micro-image $MI_N$, and/or a view that contains the second pixel of the micro-image $MI_1$, the second pixel of the micro-image $MI_2$, ..., the second pixel of the micro-image $MI_N$, ..., and/or a view that contains the Kth pixel of the micro-image $MI_1$, the Kth pixel of the micro-image $MI_2$, ..., the Kth pixel of the micro-image $MI_N$.

According to a second example, if each of the micro-images of the current integral image $II_j$ contains K pixels of different colors, the current integral image $II_j$ is decomposed into:

a view that contains the first four pixels of the micro-image $MI_1$, the first four pixels of the micro-image $MI_2$, ..., the first four pixels of the micro-image $MI_N$, these first four pixels consisting, for the micro-image in question, for example, of the first and second pixels of the first line of that micro-image together with the first and second pixels of the second line of that micro-image, and/or a view that contains the second four pixels of the micro-image $MI_1$, the second four pixels of the micro-image $MI_2$, ..., the second four pixels of the micro-image $MI_N$, these second four pixels consisting, for the micro-image in question, for example, of the third and fourth pixels of the first line of that micro-image together with the third and fourth pixels of the second line of that micro-image, ..., and/or a view that contains the last four pixels of the micro-image $MI_1$, the last four pixels of the micro-image $MI_2$, ..., the last four pixels of the micro-image $MI_N$, these last four pixels consisting, for the micro-image in question, for example, of the penultimate and last pixels of the penultimate line of that micro-image together with the penultimate and last pixels of the last line of that micro-image.

Figure 4A:
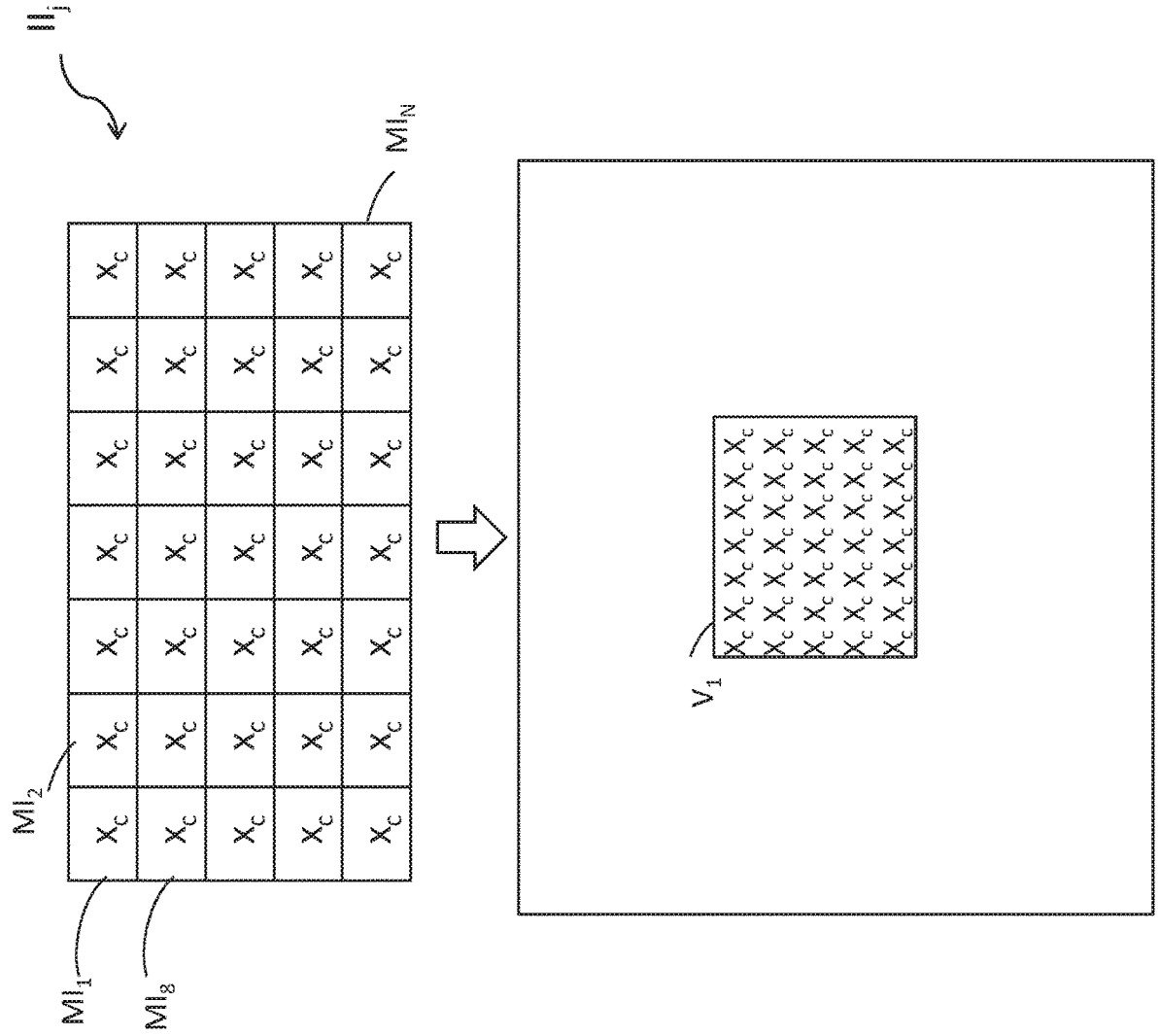
FIG. 4A represents an example of decomposition of the integral image into a single view.

According to an embodiment represented in FIG. 4A, the current integral image $II_j$ is for example decomposed into a single view $V_1$ that contains for example the pixel at the center of the micro-image $MI_1$, the pixel at the center of the micro-image $MI_2$, ..., the pixel at the center of the micro-image $MI_N$. In FIG. 4A, the central pixel of each micro-image is symbolized by "$x_c$".

Figure 4B:
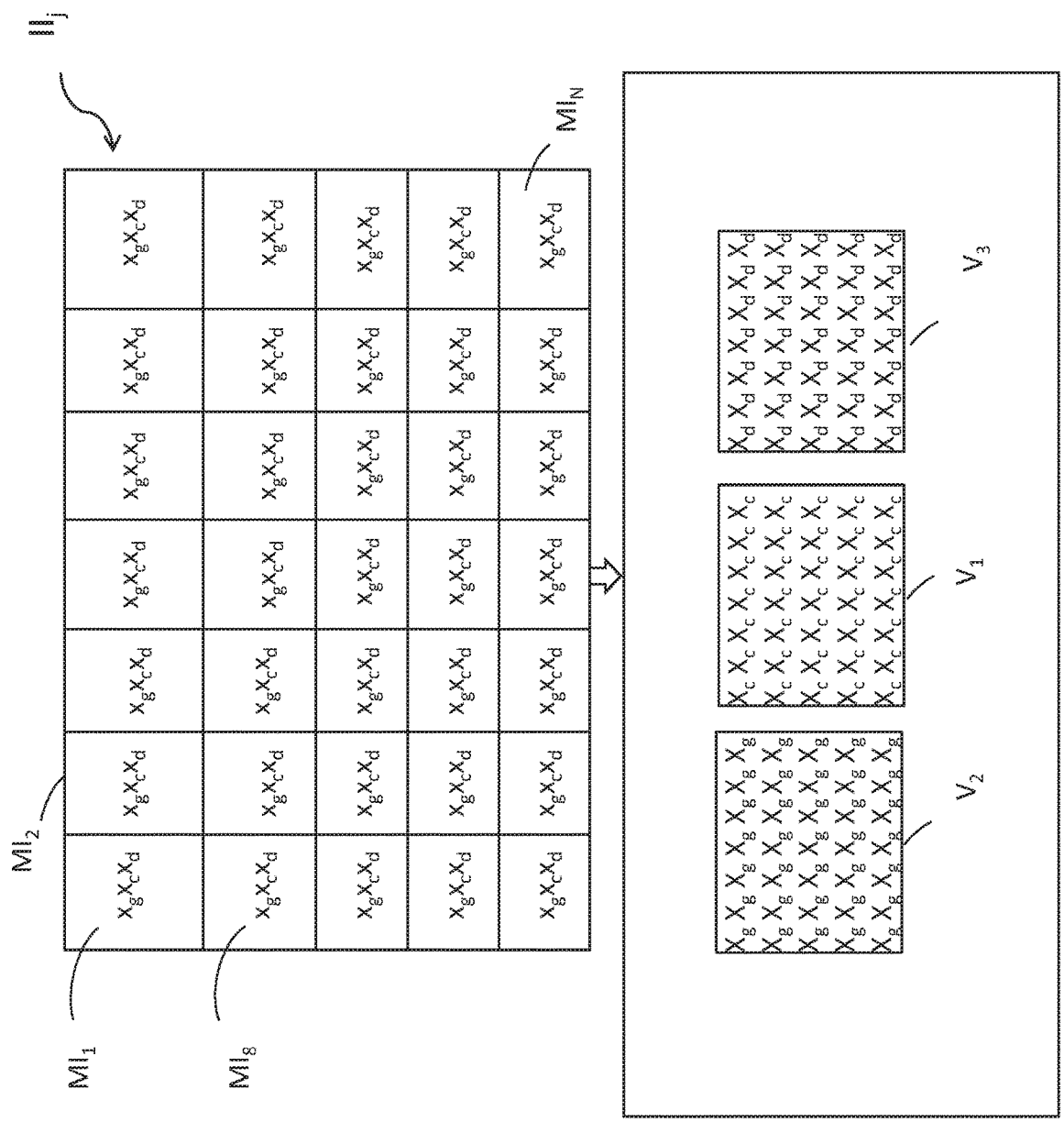
FIG. 4B represents an example of decomposition of the integral image into a plurality of views.

According to another embodiment represented in FIG. 4B, the current integral image $II_j$ is for example decomposed into three views $V_1$, $V_2$, $V_3$:

the view $V_1$ is that as represented in FIG. 4A;

the view $V_2$ contains for example the pixel to the left of the central pixel of the micro-image $MI_1$, the pixel to the left of the central pixel of the micro-image $MI_2$, ..., the pixel to the left of the central pixel of the micro-image $MI_N$; in FIG. 4B, the pixel to the left of the central pixel of each micro-image is symbolized by "$x_g$";

the view $V_3$ contains for example the pixel to the right of the central pixel of the micro-image $MI_1$, the pixel to the right of the central pixel of the micro-image $MI_2$, ..., the pixel to the right of the central pixel of the micro-image $MI_N$; in FIG. 4B, the pixel to the right of the central pixel of each micro-image is symbolized by "$x_d$".

Said at least one view $V_u$ is coded during a step C2 represented in FIG. 1.

A step C2 of this kind is implemented by a view coding software module MCV_CO as represented in FIG. 2, which module is controlled by the microprocessor μP of the processor unit UT_CO.

A view coding module MCV_CO of this kind conventionally includes:

a prediction module PRED1_CO, a residual data calculation module CAL1_CO, a transformation module MT1_CO of type DCT (from the English "Discrete Cosine Transform"), DST (from the English "Discrete Sine Transform"), DWT (from the English "Discrete Wavelet Transform")

a quantization module MQ1_CO, an entropy coding module MCE1_CO for example of the type CABAC (from the English "Context Adaptive Binary Arithmetic Coder") or a Huffman coder known in itself.

In the manner known in itself, in the step C2 there is executed a sub-step C21 of prediction of said view $V_u$ by known intra and/or inter prediction techniques. To this end, the view $V_u$ is divided into groups of pixels, for example into blocks of pixels, each block being predicted relative to at least one predictor block in accordance with a prediction mode selected from a plurality of predetermined prediction modes. For example, in the case of HEVC coding in Intra prediction mode, there are thirty five predetermined prediction modes.

A predictor block of this kind is a block of pixels that has already been coded or coded and then decoded or not. A predictor block of this kind is stored beforehand in the buffer memory TAMP_CO of the coder CO as represented in FIG. 2.

For the block in question of the view $V_u$, an optimum predictor block is obtained following competition between said predetermined prediction modes, for example by minimization of a distortion bit rate criterion well known to the person skilled in the art. The optimum predictor block is considered an approximation of the block in question.

A predictive view $Vp_u$ is obtained following the sub-step C21.

A sub-step C21 of this kind is implemented by the prediction module PRED1_CO represented in FIG. 2.

The coding step C2 also includes a sub-step C22 during which the difference is calculated between each block of the view $V_u$ and each respective corresponding optimum predictor block that was selected during the sub-step C21.

A plurality of residual data blocks is then obtained following the sub-step C22, those residual blocks constituting a residual view $Vr_u$.

A sub-step C22 of this kind is implemented by the calculation module CAL1_CO represented in FIG. 2.

The coding step C2 also includes a sub-step C23 in which each residual data block is transformed in accordance with a standard direct transformation operation such as a DCT, DST or DWT type transformation, for example, to produce a plurality of transformed blocks that constitute the transformed view $V_u$, designated by the reference $Vt_u$. An operation of this kind is effected by the module MT1_CO as represented in FIG. 2.

The coding step C2 also includes a sub-step C24 in which each transformed block is quantized in accordance with a standard quantization operation such as scalar or vector quantization, for example. A set $Vq_u$ of quantized coefficients is then obtained following this sub-step. A sub-step C24 of this kind is effected by means of the quantization module MQ1_CO as represented in FIG. 2.

A quantization sub-step of this kind is implemented by means of a predetermined quantization step $QP_1$. How this parameter is determined will be described later in the description.

The coding step C2 also includes a sub-step C25 in which the set $Vq_u$ of coefficients is coded in a predetermined order, such as in particular the "raster scan" order. In the preferred embodiment, the coding effected is Huffman or arithmetic type entropy coding. The sub-step C25 then consists in:

reading the symbol or symbols of a predetermined set of symbols that are associated with each quantized data block of the view $V_u$, associating digital information, such as bits, with the symbol or symbols that have been read.

An entropy coding sub-step C25 of this kind is implemented by the entropy coding module MCE1_CO represented in FIG. 2.

The value of the quantization step $QP_1$ is also entropically coded during the sub-step C25.

Following the step C2 of coding the view $V_u$, during a step C3 represented in FIG. 1 a data signal $F_1$ is generated that contains all of the entropically coded data associated with the view $V_u$. A signal of this kind is then transmitted to a remote terminal via a communication network (not shown). The latter terminal includes the decoder DO represented in FIG. 5.

The step C3 of producing a stream of this kind is implemented by the data stream generation module MGF1 as represented in FIG. 2.

In the manner known in itself, the signal $F_1$ contains the information used during the prediction sub-step C21. Such information notably includes the type of prediction (inter or intra) and where applicable the prediction mode selected, the type of partitioning of the blocks of the view $V_u$ if the latter have been subdivided, the index of the reference view and the displacement vector used if an inter prediction mode has been selected. Such information is entropically coded before being transmitted in the stream $F_1$.

In particular, the signal $F_1$ also contains the entropically coded value of the quantization step $QP_1$.

According to the invention, said at least one view $V_u$ is decoded during a step C4 represented in FIG. 1.

A step C4 of this kind is implemented by a view decoding software module MDV_CO as shown in FIG. 2 that is controlled by the microprocessor µP of the processor unit UT_CO.

A view coding module MDV_CO of this kind conventionally includes:
- an entropy decoding module MDE1_CO, for example of CABAC (from the English "Context Adaptive Binary Arithmetic Coder") type or a Huffman decoder known in itself,
- a dequantization module $MQ1^{-1}\_CO$,
- an inverse transformation module $MT1^{-1}\_CO$ of type $DCT^{-1}$ (from the English "Discrete Cosine Transform"), $DST^{-1}$ (from the English "Discrete Sine Transform"), $DWT^{-1}$ (from the English "Discrete Wavelet Transform"),
- an inverse prediction module $PRED1^{-1}\_CO$,
- a view reconstruction calculation module $CAL1^{-1}\_CO$.

The step C4 includes a sub-step C41 of entropy decoding of the entropically coded data associated with the view $V_u$ according to a predetermined order, such as in particular the "raster scan" order. In the preferred embodiment, the decoding effected is Huffman or arithmetic type entropy decoding. The sub-step C41 then consists in:
- reading the symbol or symbols of a predetermined set of symbols associated with each quantized block of the view $V_u$,
- associating digital information, such as bits, with the symbol or symbols that have been read.

Following the aforementioned sub-step C41 there is obtained a plurality of digital information items associated with the quantized data items that were coded during the aforementioned step C25.

An entropy decoding sub-step C41 of this kind is implemented by the entropy decoding module MDE1_CO represented in FIG. 2.

During the aforementioned sub-step C41 the index of each optimum predictor block that was used to predict each block of the view $V_u$ in the sub-step C21 from FIG. 1 is also decoded. Following this operation, each corresponding predictor block, which is stored in the buffer memory TAMP_CO of the coder CO from FIG. 2, is therefore identified in this way. Predictor blocks of this type are for example blocks of pixels that may have already been decoded and that were obtained according to the prediction mode selected when coding the view $V_u$.

The coding step C4 also includes a sub-step C42 during which the digital information obtained following the sub-step C41 is dequantized according to a standard dequantization operation that is the inverse operation of the quantization carried out in the sub-step C24. A set $VDq_u$ of dequantized coefficients is then obtained following this sub-step. A sub-step C42 of this kind is effected by means of the dequantization module $MQ1^{-1}\_CO$ as represented in FIG. 2.

The coding step C4 also includes a sub-step C43 during which the set $VDq_u$ of quantized coefficients that is of type $DCT^{-1}$, $DST^{-1}$ or $DWT^{-1}$ is transformed. This transformation is the inverse operation of the transformation effected in the sub-step C23. Following this sub-step there is obtained a plurality of decoded residual data blocks that constitute the decoded residual view $V_u$ designated by the reference $VDr_u$. An operation of this kind is effected by the module $MT1^{-1}\_CO$ represented in FIG. 2.

The coding step C4 also includes a sub-step C44 of prediction of said view $V_u$ to be decoded by selection of the optimum predictive view consisting of the optimum predictor blocks obtained after the aforementioned sub-step C21.

A sub-step C44 of this kind is implemented by the prediction module $PRED1^{-1}\_CO$ represented in FIG. 2.

The coding step C4 also includes a calculation sub-step C45 during which the decoded view $VD_u$ is constructed by adding to each of the decoded residual blocks of the decoded residual view $VDr_u$ obtained following the sub-step C43 each of the respective corresponding predictor blocks that were identified in the aforementioned sub-step C41.

A sub-step C45 of this kind is implemented by the calculation module $CAL1^{-1}\_CO$ represented in FIG. 2.

According to the invention, during a step C5 represented in FIG. 1 the current integral image $II_j$ is recomposed on the basis of said at least one decoded view $VD_u$. A step of this kind consists in applying an inverse decomposition to said decomposition of the integral image effected in the aforementioned step C1, taking account of the resolution of said at least one view $V_u$ and its position in the current integral image $II_j$.

The step C5 is implemented by a view recomposition software module $MDCV^{-1}\_CO$ as represented in FIG. 2.

According to a first example, if each of the micro-images of the current integral image $II_j$ contains K pixels of different colors, the current integral image $IIrec_j$ is recomposed into:
- a view that contains the first pixel of the micro-image $MI_1$, the first pixel of the micro-image $MI_2$, . . . , the first pixel of the micro-image $MI_N$, and/or
- a view that contains the second pixel of the micro-image $MI_1$, the second pixel of the micro-image $MI_2$, . . . , the second pixel of the micro-image $MI_N$,
- . . . , and/or
- a view that contains the Kth pixel of the micro-image $MI_1$, the Kth pixel of the micro-image $MI_2$, . . . , the Kth pixel of the micro-image $MI_N$.

According to a second example, if each of the micro-images of the current integral image $II_j$ contains K pixels of different colors, the current integral image $II_j$ is recomposed into:
- a view that contains the first four pixels of the micro-image $MI_1$, the first four pixels of the micro-image $MI_2$, . . . , the first four pixels of the micro-image $MI_N$, these first four pixels consisting, for the micro-image in question, for example, of the first and second pixels of the first line of that micro-image and the first and second pixels of the second line of that micro-image, and/or
- a view that contains the second four pixels of the micro-image $MI_1$, the second four pixels of the micro-image $MI_2$, . . . , the second four pixels of the micro-image $MI_N$, these second four pixels consisting, for the micro-image in question, for example, of the third and fourth pixels of the first line of that micro-image and the third and fourth pixels of the second line of that micro-image, ..., and/or a view that contains the last four pixels of the micro-image $MI_1$, the last four pixels of the micro-image $MI_2$, ..., the last four pixels of the micro-image $MI_N$, these last four pixels consisting, for the micro-image in question, for example, of the penultimate and last pixels of the penultimate line of that micro-image and the penultimate and last pixels of the last line of that micro-image.

According to the embodiment represented in FIG. 4A, the current recomposed integral image $IIrec_j$ consists of a single view $V_1$ that contains for example the pixel at the center of the micro-image $MI_1$, the pixel at the center of the micro-image $MI_2$, ..., the pixel at the center of the micro-image $MI_N$.

According to the other embodiment represented in FIG. 4B, the current recomposed integral image $IIrec_j$ consists of three views $V_1, V_2, V_3$:

the view $V_1$ is that as represented in FIG. 4A, the view $V_2$ contains for example the pixel to the left of the central pixel of the micro-image $MI_1$, the pixel to the left of the central pixel of the micro-image $MI_2$, ..., the pixel to the left of the central pixel of the micro-image $MI_N$, the view $V_3$ contains for example the pixel to the right of the central pixel of the micro-image $MI_1$, the pixel to the right of the central pixel of the micro-image $MI_2$, ..., the pixel to the right of the central pixel of the micro-image $MI_N$.

According to the invention, during a step C6 represented in FIG. 1 the difference is calculated between the current integral image $II_j$ and the recomposed integral image $IIrec_j$ that was obtained in the step C5.

A current residual integral image $IIres_j$ is then obtained following the step C6.

A step C6 of this kind is implemented by a calculation module CAL2_CO represented in FIG. 2.

A current residual integral image $IIres_j$ of this kind is then considered a two-dimensional (2D) image that undergoes 2D coding during a step C7 represented in FIG. 1. According to the invention, any type of 2D coding may be applied.

A step C7 of this kind is implemented by an image coding software module MDCI as represented in FIG. 2, which module is controlled by the microprocessor µP of the processor unit UT_CO.

A two-dimensional image coding module MDCI of this kind may include, for example:

a prediction module PRED2_CO, a residual data calculation module CAL3_CO, a transformation module MT2_CO of type DCT (from the English "Discrete Cosine Transform"), DST (from the English "Discrete Sine Transform"), DWT (from the English "Discrete Wavelet Transform"), a quantization module MQ2_CO, an entropy coding module MCE2_CO, for example of CABAC type (from the English "Context Adaptive Binary Arithmetic Coder") or a Huffman coder known in itself.

The step C7 includes a sub-step C71 of prediction of said residual integral image $IIres_j$ using known intra and/or inter prediction techniques. To this end, the residual integral image $IIres_j$ is subdivided into groups of pixels, for example into blocks of pixels, each block being predicted relative to at least one predictor block in accordance with a prediction mode selected from a plurality of predetermined prediction modes. For example, in the case of HEVC coding in Intra prediction mode, there are thirty-five predetermined prediction modes.

A predictor block of this kind is a block of pixels that may have already been coded or coded and then decoded. A predictor block of this kind is stored beforehand in the buffer memory TAMP_CO of the coder CO as represented in FIG. 2.

For the block in question of the residual integral image $IIres_j$, an optimum predictor block is obtained following competition between said predetermined prediction modes, for example by minimization of a distortion bit rate criterion well known to the person skilled in the art. The optimum predictor block is considered an approximation of the block in question.

A predictive residual integral image $IIresp_j$ is obtained following the sub-step C71

A sub-step C71 of this kind is implemented by the prediction module PRED2_CO represented in FIG. 2.

The coding step C7 also includes a sub-step C72 during which the difference is calculated between each block of the residual integral image $IIres_j$ and each respective corresponding optimum predictor block that was selected during the sub-step C71.

A plurality of residual data blocks is then obtained following the sub-step C72, these residual blocks constituting a residual integral image $IIresr_j$.

A sub-step C72 of this kind is implemented by the calculation module CAL3_CO represented in FIG. 2.

The coding step C7 also includes a sub-step C73 in which each residual data block obtained in the sub-step C72 is transformed according to a standard direct transformation operation such as for example a transformation of type DCT, DST or DWT, to produce a plurality of transformed blocks that constitute the transformed residual integral image designated by the reference $IIrest_j$. An operation of this kind is effected by the module MT2_CO represented in FIG. 2.

The coding step C7 also includes a sub-step C74 during which each transformed block obtained in the sub-step C73 is quantized in accordance with a standard quantization operation such as for example scalar or vector quantization. A set $IIresq_u$ of quantized coefficients is then obtained following this sub-step. A sub-step C74 of this kind is effected by means of the quantization module MQ2_CO as represented in FIG. 2.

Also, a quantization sub-step of this kind is implemented by means of a predetermined quantization step $QP_2$. How this parameter is determined will be described later in the description.

The coding step C7 also includes a sub-step C75 during which the set $IIresq_u$ of coefficients is coded according to a predetermined order, such as in particular the "raster scan" order. In the preferred embodiment, the coding effected is Huffman or arithmetic type entropy coding. The sub-step C75 then consists in:

reading the symbol or symbols of a predetermined set of symbols that are associated with each quantized data block of the current residual integral image associating digital information, such as bits, with the symbol or symbols that have been read.

An entropy coding sub-step C75 of this kind is implemented by the entropy coding module MCE2_CO represented in FIG. 2.

The value of the quantization step $QP_2$ is also entropically coded during the sub-step C75.

Following the step C7 of coding the residual integral image IIres$_j$, during a step C8 represented in FIG. 1, a data signal F$_2$ is generated that contains all of the entropically coded data associated with the current residual integral image IIres$_j$. A signal F$_2$ of this kind is then transmitted via a communication network (not shown) to a remote terminal that includes the decoder DO represented in FIG. 5.

The step C8 of producing a stream of this kind is implemented by the data stream generation module MGF2 as represented in FIG. 2.

In the manner known in itself, the signal F$_2$ contains information used during the prediction sub-step C71. Information of this kind notably includes the type of prediction (inter or intra) and where appropriate the prediction mode selected, the type of partitioning of the blocks of the residual integral image IIres$_j$ if the latter have been subdivided, the index of the reference integral image and the displacement vector used when an inter prediction mode has been selected. Information of this kind is entropically coded before being transmitted in the stream F$_2$.

In particular, the signal F$_2$ also contains the entropically coded value of the quantization step QP$_2$.

In the embodiment represented in FIGS. 1 and 2 the data signals F$_1$ and F$_2$ are multiplexed to form a single signal that is transmitted to the decoder DO.

Alternatively, the data signals F$_1$ and F$_2$ could be transmitted separately to the decoder DO.

For its part the micro-images resolution parameter of the current integral image II$_j$, denoted p$_{rsi}$ in FIGS. 1 and 2, is entropically coded either during the entropy coding sub-step C25 or during the entropy coding sub-step C75. The micro-images resolution parameter is therefore inserted either in the data signal F$_1$ or in the data signal F$_2$ or in another data signal (not shown) that can be transmitted to the decoder DO separately or multiplexed with the data signals F$_1$ and F$_2$.

Before the step C1 of decomposition into at least one view V$_u$, the number of views and their position are selected as being those that optimize a predetermined coding performance criterion. For example, the number and the position of the views are selected by minimization for example of a distortion bit rate criterion well known to the person skilled in the art, which is applied in the coding step C2 and in the coding step C7.

According to a second embodiment, the number and the position of the views are selected as being those that minimize the quantity of data associated with the residual integral image IIres$_j$ obtained following the step C6 from FIG. 1.

Depending on the required coding context, the number and the position of the views that have been selected in this way may be transmitted to the decoder DO.

The value of the quantization step QP$_1$ used in the quantization sub-step C24 and the value of the quantization step QP$_2$ used in the quantization sub-step C74 are selected as optimizing a predetermined coding performance criterion.

According to one embodiment, the quantization steps QP$_1$ and QP$_2$ are each selected by minimization for example of a distortion bit rate criterion well known to the person skilled in the art that is applied in the coding step C2 and in the coding step C7.

In a variant of the embodiment that has just been described above, as shown in FIG. 1, there also follow(s):
  directly after the step C1, a step CI1 of transformation of the current integral image II$_j$ decomposed into at least said view V$_u$, and/or
  directly after the step C4 of decoding of said at least one view, a step CI2 of transformation of said reconstructed view VD$_u$ obtained following the sub-step C45, and/or
  directly after the step C5 of recomposition of the current integral image, a step CI3 of transformation of the recomposed current integral image IIrec$_j$.

The object of this transformation or these transformations is to reduce the amount of data to be coded in the residual integral image IIres$_j$ obtained following the step C6 from FIG. 1. An objective of this kind implies obtaining a recomposed image that best resembles the original integral image II$_j$ and therefore of achieving efficacious recomposition.

In a preferred variant, only said transformation step CI2 is applied because it makes it possible to obtain the most effective recomposition of the current integral image II$_j$.

Said transformation steps being optional, they are represented in dashed line in FIG. 1.

The transformation steps CI1, CI2 and CI3 are implemented by respective transformation software modules TR1_CO, TR2_CO and TR3_CO as represented in dashed line in FIG. 2.

Each of the transformation steps CI1, CI2 and CI3 uses a corresponding transformation parameter Ptr$_1$, Ptr$_2$, Ptr$_3$.

According to a first embodiment, the transformation parameters Ptr$_1$, Ptr$_2$, Ptr$_3$ are selected as being those that optimize a predetermined coding performance criterion. For example, the latter are selected by minimization for example of a distortion bit rate criterion well known to the person skilled in the art, which is applied in the coding step C2 and in the coding step C7.

According to a second embodiment, the transformation parameters Ptr$_1$, Ptr$_2$, Ptr$_3$ are selected as being those that minimize the quantity of data associated with the residual integral image IIres$_j$ obtained following the step C6 from FIG. 1.

Depending on the required coding context, the transformation parameters Ptr$_1$, Ptr$_2$, Ptr$_3$ may be transmitted to the decoder DO.

One possible example of transformation is smoothing. The parameter associated with this transformation corresponds to the size in pixels of the smoothing filter applied to the image.

Because decomposition into views leads to a loss of information, i.e. loss of the information contained in the views that are not extracted during the decomposition step C1, during the inverse decomposition step C5 erroneous information is introduced in place of this missing information. The recomposed integral image IIrec$_j$ then contains details that do not correspond to the details of the current original integral image II$_j$.

As a result of this:
  the details of the current original integral image II$_j$ are not compensated/cancelled during the subtraction step C6 and remain in the residual integral image IIres$_j$,
  details of the recomposed integral image IIrec$_j$ that correspond to erroneous (and therefore useless) information come to be added into the residual integral image IIres$_j$.

Smoothing the recomposed integral image IIrec$_j$ (and/or said at least one view V$_u$ and/or said at least one reconstructed view VD$_u$) makes it possible to smooth these detail zones and consequently to smooth the residual integral image IIres$_j$, which makes the latter less costly to code.

In a variant of this smoothing, a geometrical transformation (expansion, erosion, rotation, symmetry, etc.) could be applied to said at least one view $V_u$ and/or to said at least one reconstructed view $VD_u$ and/or to the recomposed integral image Detailed Description of the Decoding Part One embodiment of the decoding method according to the invention will now be described in which the decoding method is implemented in software or hardware by modification of a decoder initially conforming to any current or future video decoding standards.

Figure 6:
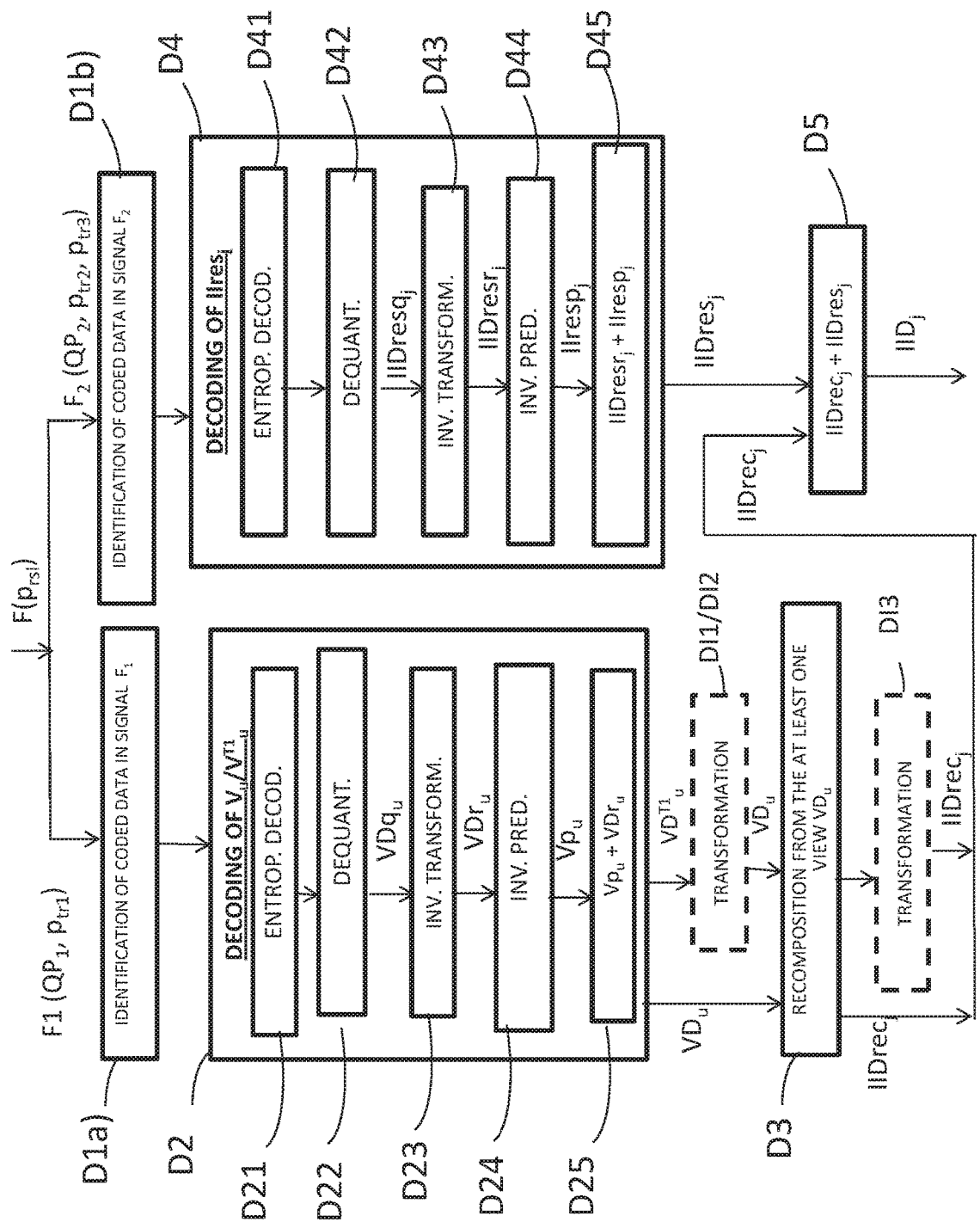
FIG. 6 represents the principal steps of the decoding method according to the invention.

The decoding method according to the invention is represented in the form of an algorithm including steps D1 to D5 as represented in FIG. 6.

Figure 5:
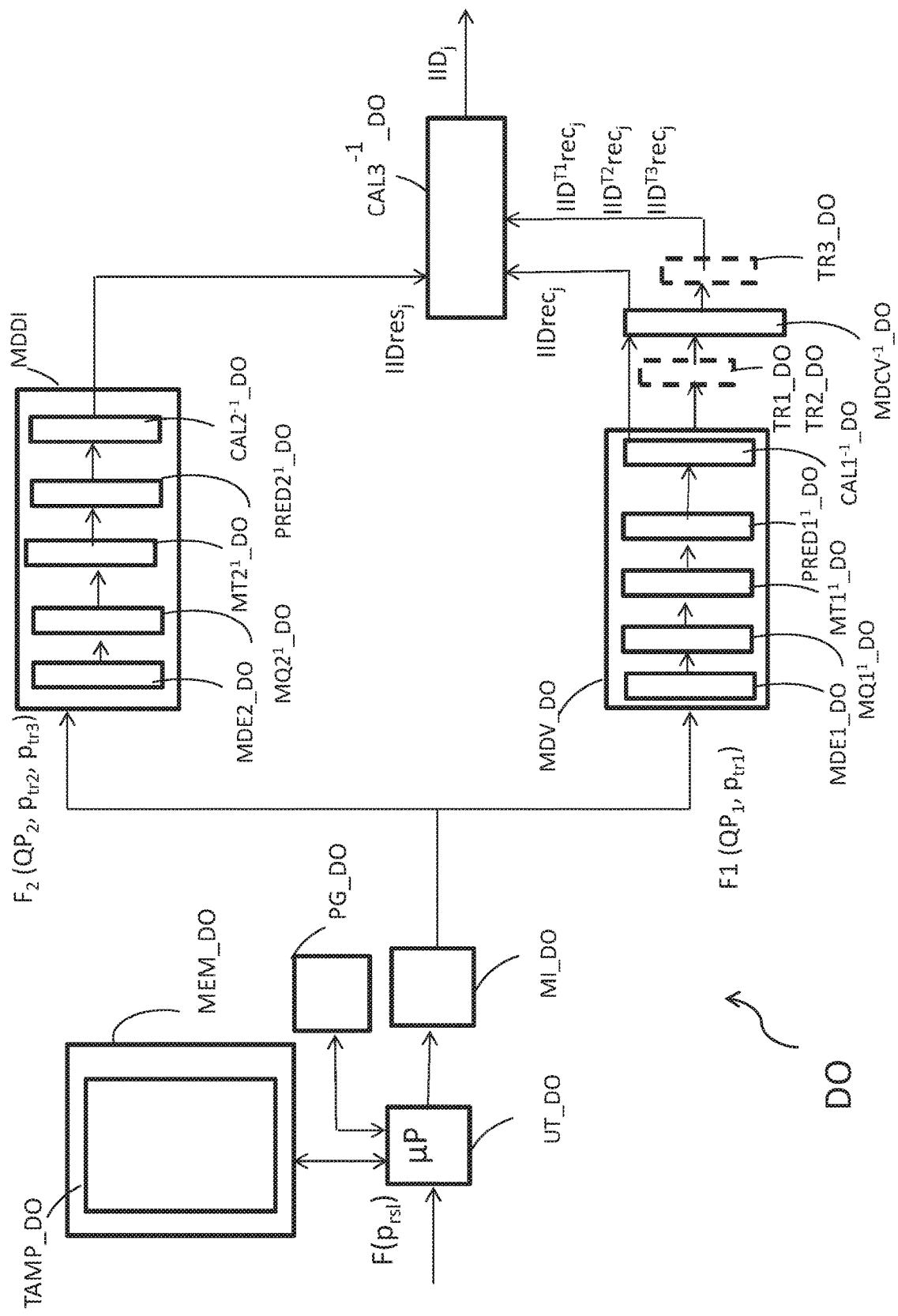
FIG. 5 represents one embodiment of a decoding device according to the invention.

As shown in FIG. 5, the decoder DO according to this embodiment of the invention includes a memory MEM_DO including a buffer memory TAMP_DO, a processor unit UT_DO including for example a microprocessor µP and controlled by a computer program PG_DO that implements the decoding method according to the invention. At the time of initialization, the code instructions of the computer program PG_DO are for example loaded into a RAM before being executed by the processor of the processor unit UT_DO.

The decoding method represented in FIG. 6 is applied to any current integral image $II_j$ to be decoded that is still or forms part of a sequence of integral images . . . , $II_j$, . . . , $II_M$ ($1 \le j \le M$) to be decoded.

To this end, information representing the current integral image $II_j$ to be decoded is identified in the data signal F received at the decoder, as delivered following the coding method from FIG. 1.

Referring to FIG. 6, during a step D1a) there are identified in said signal $F_1$ that constitutes the data signal F:

the resolution parameter $p_{rsi}$ of the micro-images of the current integral image $II_j$ that has been coded, if that parameter was inserted in the signal $F_1$, all of the data associated with the view $V_u$, as entropically coded following the coding sub-step C25 from FIG. 1, in accordance with the aforementioned raster scan order, the quantization step $QP_1$, the number and the position of said at least one view $V_u$ if these parameters were transmitted in the signal $F_1$, the image transformation parameter $Ptr_j$ if that parameter was transmitted in the signal $F_1$, identification information of each predictor block constituting the predictive view $Vp_u$ obtained following the prediction sub-step C21 of the coding method represented in FIG. 1, information of this kind consisting for example of the index of each of these predictor blocks, other information relating to prediction that notably includes the type of prediction (inter or intra), and where appropriate the prediction mode selected, the type of partitioning of the blocks of the view $V_u$ if the latter have been subdivided, the index of the reference view and the displacement vector used if an inter prediction mode has been selected.

Referring to FIG. 6, in parallel with the implementation of the identification step D1a), during a step D1b) there are identified in said signal $F_2$ that also constitutes the data signal F:

the resolution parameter $p_{rsi}$ of the micro-images of the current integral image $II_j$ that was coded, if that parameter was inserted in the signal $F_2$, all of the data associated with the current residual integral image $IIres_j$ as entropically coded following the coding sub-step C75 from FIG. 1, in accordance with the aforementioned raster scan order, the quantization step $QP_2$, the image transformation parameter or parameters $Ptr_2$, $Ptr_3$ if those parameters were transmitted in the signal F, identification information of each predictor block constituting the predictive residual integral image $IIresp_j$ obtained following the prediction sub-step C71 of the coding method represented in FIG. 1, information of this kind consisting for example in the index of each these predictor blocks, other information relating to prediction that notably includes the type of prediction (inter or intra) and where applicable the prediction mode selected, the type of partitioning of the blocks of the residual integral image $IIres_j$ if the latter have been subdivided, the index of the reference integral image and the displacement vector used if an inter prediction mode was selected.

The identification steps D1a) and D1b) are implemented by a signal analysis module MI_DO as represented in FIG. 5, said module being controlled by the microprocessor µP of the processor unit UT_DO.

According to the invention, following the step D1a), during a step D2 represented in FIG. 6, said at least one entropically coded view $V_u$ is decoded.

A step D2 of this kind is implemented by a view decoding software module MDV_DO as represented in FIG. 5, which module is controlled by the microprocessor µP of the processor unit UT_DO.

A view decoding module MDV_DO of this kind conventionally includes:

an entropy decoding module MDE1_DO, for example of CABAC type (from the English "Context Adaptive Binary Arithmetic Coder") or a Huffman decoder known in itself, a dequantization module $MQ1^{-1}$_DO, an inverse transformation module $MT1^{-1}$_DO of type $DCT^{-1}$ (from the English "Discrete Cosine Transform"), $DST^{-1}$ (from the English "Discrete Sine Transform"), $DWT^{-1}$ (from the English "Discrete Wavelet Transform"), an inverse prediction module $PRED1^{-1}$_DO, a view reconstruction calculation module $CAL1^{-1}$_DO.

The decoding step D2 includes a sub-step D21 of entropy decoding of the entropically coded data associated with the view $V_u$ in a predetermined order such as in particular the "raster scan" order. In the preferred embodiment, the decoding effected is Huffman or arithmetic type entropy decoding. The sub-step D21 then consists in:

reading the symbol or symbols of a predetermined set of symbols that are associated with each quantized block of the view $V_u$, associating digital information, such as bits, with the symbol or symbols that have been read.

Following the aforementioned sub-step D21 there is obtained a plurality of digital information items associated with the quantized data items that were coded during the entropy coding step C25 from FIG. 1.

An entropic decoding sub-step D21 of this kind is implemented by the entropy decoding module MDE1_DO represented in FIG. 5.

During the aforementioned sub-step D21 the index is also decoded of each optimum predictor block that was used to predict each block of the view $V_u$ during the sub-step C21 from FIG. 1. Following this operation, each corresponding predictor block, which is stored in the buffer memory TAMP_DO of the decoder DO from FIG. 5, is therefore identified in this way. Predictor blocks of this kind are for example blocks of pixels that may have already been decoded and that were obtained according to the prediction mode selected when coding the view $V_u$.

The decoding step D2 also includes a sub-step D22 during which, using the entropically decoded value of the quantization parameter $QP_1$, digital information obtained following the sub-step D21 is dequantized according to a standard dequantization operation that is the inverse operation of the quantization effected during the quantization sub-step C24 from FIG. 1. A set $VDq_u$ of dequantized coefficients is then obtained following the sub-step D22. A sub-step D22 of this kind is effected by means of the quantization module $MQ1^{-1}\_DO$ as represented in FIG. 5.

The decoding step D2 also includes a sub-step D23 during which the set $VDq_u$ of quantized coefficients that is of type $DCT^{-1}$, $DST^{-1}$ or $DWT^{-1}$ is transformed. This transformation is the inverse operation of the transformation effected in the sub-step C23 from FIG. 1. Following the sub-step D23 there is obtained a plurality of decoded residual data blocks that constitute the decoded residual view $V_u$ designated by the reference $VDr_u$. An operation of this kind is effected by the module $MT1^{-1}\_DO$ represented in FIG. 5.

The decoding step D2 also includes a sub-step D24 of prediction of said value $V_u$ to be decoded by selection of the optimum predictive view consisting of the optimum predictor blocks obtained following the aforementioned sub-step D21.

A sub-step D24 of this kind is implemented by the prediction module $PRED1^{-1}\_DO$ represented in FIG. 5.

The decoding step D2 also includes a calculation sub-step D25 during which the decoded view $VD_u$ is constructed by adding to each of the decoded residual blocks of the decoded residual view $VDr_u$ obtained following the sub-step D23 each of the respective corresponding predictor blocks that were identified in the aforementioned sub-step D21.

A sub-step D25 of this kind is implemented by the calculation module $CAL1^{-1}\_DO$ represented in FIG. 5.

According to the invention, during a step D3 represented in FIG. 6, the current integral image $II_j$ is recomposed from said at least one decoded view $VD_u$. A step of this kind consists in applying an inverse decomposition to said decomposition of the integral image effected in the coding step C1 from FIG. 1, taking account of the value of the resolution parameter $p_{rsl}$ that was entropically decoded in the step D21 and of the position of said at least one view in the current integral image $II_j$. Following the step D3 a decoded recomposed integral image is obtained that is denoted $IIDrec_j$ in FIG. 6.

The step D3 is implemented by a view recomposition software module $MDCV^{-1}\_DO$ as represented in FIG. 5, said module being controlled by the microprocessor µP of the processor unit UT_DO.

During the step D3:
either the number of views and their position are entropically decoded in the data signal $F_1$ if the coder CO from FIG. 2 transmitted them in the signal $F_1$,
or the number of views and their position are known from the decoder DO from FIG. 5.

If the number of views and their position are known from the decoder DO:
according to a first embodiment, these parameters were selected during coding as being those that optimize a predetermined coding performance criterion; for example, the number and the position of the views are selected by minimization of a distortion bit rate criterion well known to the person skilled in the art, for example, that was applied in the coding step C2 and in the coding step C7 from FIG. 1,
according to a second embodiment, these parameters were selected as being those that minimize the quantity of data associated with the residual integral image $IIres_j$ obtained following the step C6 from FIG. 1.

The integral image $II_j$ to be decoded is then recomposed into one or more views, as represented in the examples from FIGS. 4A and 4B.

According to the invention, following the step D1b), during a step D4 represented in FIG. 6, the current residual integral image $IIres_j$ that was coded during the step C4 represented in FIG. 1 is decoded in two dimensions. The type of 2D decoding effected conforms to the type of 2D coding used in the step C7 from FIG. 1.

A step D4 of this kind is implemented by an image decoding software module MDDI as represented in FIG. 5, which module is controlled by the microprocessor µP of the processor unit UT_DO.

In a corresponding manner to the module MDCI represented in FIG. 2, the decoding module MDDI may include, for example:
an entropy decoding module MDE2_DO, for example of CABAC type (from the English "Context Adaptive Binary Arithmetic Coder") or a Huffman decoder known in itself,
a dequantization module $MQ2^{-1}\_DO$,
an inverse transformation module $MT2^{-1}\_DO$ of type DCT (from the English "Discrete Cosine Transform"), DST (from the English "Discrete Sine Transform"), DWT (from the English "Discrete Wavelet Transform"),
an inverse prediction module $PRED2^{-1}\_DO$,
an integral image reconstruction calculation module $CAL2^{-1}\_DO$.

The decoding step D4 includes a sub-step D41 of entropy decoding of the entropically coded data associated with the current residual integral image $IIres_j$ as obtained following the sub-step C75 from FIG. 1. A sub-step D41 of this kind is effected in accordance with a predetermined order, such as in particular the "raster scan" order. In the preferred embodiment, the decoding effected is Huffman or arithmetic type entropy decoding. The sub-step D41 then consists in:
reading the symbol or symbols of a predetermined set of symbols that are associated with each quantized block of the current residual integral image $IIres_j$,
associating digital information, such as bits, with the symbol or symbols that have been read.

Following the aforementioned sub-step D41 a plurality of digital information items is obtained associated with the quantized data items that were coded during the entropy coding step C75 from FIG. 1.

An entropy decoding sub-step D41 of this kind is implemented by the entropy decoding module MDE2_DO represented in FIG. 5.

During the aforementioned sub-step D41 the index is also decoded of each optimum predictor block that was used to predict each block of the current residual integral image $IIres_j$ during the sub-step C71 from FIG. 1. Following this operation, each corresponding predictor block, which is stored in the buffer memory TAMP_DO of the decoder DO from FIG. 5, is therefore identified in this way. Predictor blocks of this kind are for example blocks of pixels that may have already been decoded and that were obtained according to the prediction mode selected when coding the current residual integral image $IIres_j$.

The decoding step D4 also includes a sub-step D42 during which there is dequantized, using the value of the entropically decoded quantization parameter $QP_2$, digital information obtained following the sub-step D41, in accordance with a standard dequantization operation that is the inverse operation of the quantization carried out during the quantization sub-step C74 from FIG. 1. A set IIDresq$_j$ of dequantized coefficients is then obtained following the sub-step D42. A sub-step D42 of this kind is implemented by means of the quantization module $MQ2^{-1}\_DO$ as represented in FIG. 5.

The decoding step D4 also includes a sub-step D43 during which there is effected a transformation of the set IIDresq$_j$ of quantized coefficients that is of type $DCT^{-1}$, $DST^{-1}$ or $DWT^{-1}$. This transformation is the inverse operation of the transformation effected in the sub-step C73 from FIG. 1. Following the sub-step D43 a plurality of decoded residual data blocks is obtained that constitutes the decoded residual integral image designated by the reference IIDresr$_j$. An operation of this kind is effected by the module $MT2^{-1}\_DO$ represented in FIG. 5.

The decoding step D4 also includes a sub-step D44 of prediction of said residual integral image IIres$_j$ to be decoded by selection of the optimum predictive residual integral image consisting of the optimum predictor blocks obtained following the aforementioned sub-step D41.

A sub-step D44 of this kind is implemented by the prediction module $PRED2^{-1}\_DO$ represented in FIG. 5.

The decoding step D4 also includes a calculation sub-step D45 during which the decoded residual integral image IIDres$_j$ is constructed by adding to each of the decoded residual blocks of the decoded residual integral image IIDresr$_j$ obtained following the sub-step D43 each of the respective corresponding predictor blocks that were identified in the aforementioned sub-step D41.

A sub-step D45 of this kind is implemented by the calculation module $CAL2^{-1}\_DO$ represented in FIG. 5.

According to the invention, during a step D5 represented in FIG. 6 there is calculated the sum of the decoded recomposed integral image IIDrec$_j$ that was obtained following the aforementioned step D3 and the decoded residual integral image IIDres$_j$ that was obtained following the sub-step D45.

A current decoded integral image IID$_j$ is then obtained following the step D5.

A step D5 of this kind is implemented by a calculation software module $CAL3^{-1}\_DO$ represented in FIG. 5.

In a variant of the embodiment that has just been described above, as shown in FIG. 6, there are also executed:
directly following the step D2 of decoding said at least one view, a step DI1 and/or DI2 of transformation of said reconstructed view $VD_u$ that is the inverse transformation of the respective transformation step CI1 and/or CI2 effected during coding, and/or
directly following the step D3 of recomposition of the current decoded integral image, a step DI3 of transformation of the recomposed current decoded integral image IIDrec$_j$ that is the inverse transformation of the transformation step CI3 effected during coding.

In a preferred variant, only said transformation step DI2 is applied using the transformation parameter $p_{tr2}$ because it makes it possible to achieve the most efficaceous recomposition of the current decoded integral image.

Said transformation steps being optional, they are represented in dashed line in FIG. 6.

The transformation steps DI1, DI2, DI3 are implemented by respective transformation software modules TR1_DO, TR2_DO and TR3_DO, as represented in dashed line in FIG. 5.

Each of the transformation steps DI1, DI2 and DI3 uses a corresponding transformation parameter $Ptr_1$, $Ptr_2$, $Ptr_3$.

During each of these steps DI1, DI2, DI3:
either the parameter or parameters $Ptr_1$, $Ptr_2$, $Ptr_3$ are entropically decoded either during the step D21 or during the step D41 if the coder CO from FIG. 2 transmitted them in the signals $F_1$ and $F_2$,
or the parameter or parameters $Ptr_1$, $Ptr_2$, $Ptr_3$ are known to the decoder DO from FIG. 5.

When the parameter or parameters $Ptr_1$, $Ptr_2$, $Ptr_3$ are known to the decoder DO:
according to a first embodiment, these parameters were selected during coding as being those that optimize a predetermined coding performance criterion; for example, the parameter or parameters $Ptr_1$, $Ptr_2$, $Ptr_3$ are selected by minimization of a distortion bit rate criterion well known to the person skilled in the art, for example, that was applied in the coding step C2 and in the coding step C7 from FIG. 1,
according to a second embodiment, the parameter or parameters $Ptr_1$, $Ptr_2$, $Ptr_3$ were selected as being those that minimize the quantity of data associated with the residual integral image IIres$_j$ obtained following the step C6 from FIG. 1.

It goes without saying that the embodiments that have been described above have been described by way of nonlimiting and illustrative example only and that numerous modifications may easily be made by the person skilled in the art without this departing from the scope of the invention.

The invention claimed is:

1. A method of coding at least one current integral image captured by an image capture device, the method comprising:
   with a coding device:
   decomposing the current integral image into a plurality of views, each of the views representing a perspective of a scene and from at least one image capture parameter associated with the image capture device,
   selecting one view or a subset of the views, wherein the one or the subset are less than the total amount of the views,
   coding said one view or said subset of the among the plurality of views,
   decoding said one view or said subset of the views by a view decoding module of said coding device,
   recomposing partially the current integral image from said one decoded view or said subset of the decoded views by a view recomposition module of said coding device, by application of an inverse decomposition of said decomposition of the integral image and from said at least one image capture parameter associated with the image capture device,
   determining a residual integral image by comparison of said at least one current integral image with said integral image which has been recomposed partially,
   coding the data associated with the residual integral image and said at least one image capture parameter associated with the image capture device.

2. The coding method as claimed in claim 1, including:
generating a first data signal containing data coming from the coding of said one view or said subset of the views, and generating a second data signal containing the data associated with the coded residual integral image, said at least one image capture parameter associated with the image capture device being contained either in the first signal or in the second signal or in another data signal to be generated.

3. The coding method as claimed in claim 1, in which a number and a position of the one view or the subset of the views to be coded of the current integral image are selected as being those that optimize a predetermined coding performance criterion.

4. The coding method as claimed in claim 3, in which a number and a position of the one view or the subset of the views of the current integral image are selected as being those that minimize the quantity of data associated with the residual integral image.

5. The coding method as claimed in claim 1, during which a selection of a value of a first quantization parameter to be applied is performed during the coding of said one view or said subset of the views and a selection of a value of a second quantization parameter to be applied is performed during the coding of the data associated with the residual integral image, said values being selected as optimizing a predetermined coding performance criterion.

6. The coding method as claimed in claim 1, further including a modification of the current integral image, said modification being applied:
between the act of decomposition of the current integral image into said one view or said subset of the views and the act of coding said one view or said subset of the views, and/or
between the act of decoding said one view or said subset of the views and the act of partial recomposition of the current integral image, and/or
between the act of partial recomposition of the current integral image and the act of determination of the residual integral image.

7. The coding method as claimed in claim 6, in which said modification is implemented using a modification parameter that is selected as optimizing a predetermined coding performance criterion or as minimizing the quantity of data associated with the residual integral image.

8. A device for coding at least one current integral image captured by an image capture device, said coding device comprising:
a processor, and
a non-transitory computer-readable medium comprising instructions stored thereon, which when executed by the processor configure the coding device to perform acts comprising:
decomposing the current integral image into a plurality of views, each view of the views representing a perspective of a scene and from at least one image capture parameter associated with the image capture device,
selecting one view or a subset of the views, wherein the one or the subset are less than the total amount of the views,
coding said one view or said subset of the views among the plurality of views,
decoding said one view or said subset of the views by a view decoding module of said coding device,
recomposing partially the current integral image from said one decoded view or said subset of the decoded views by a view recomposition module of said coding device, by application of an inverse decomposition of said decomposition of the integral image and from said at least one image capture parameter associated with the image capture device,
determining a residual integral image by comparison of said at least one current integral image with said integral image which has been recomposed partially,
coding the data associated with the residual integral image and said at least one image capture parameter associated with the image capture device.

9. A non-transitory computer-readable data medium on which at least one series of program code instructions is stored for execution of a coding method at least one current integral image captured by an image capture device, when the instructions are executed by a processor of a coding device, wherein the instructions configure the coding device to performs acts comprising:
decomposing the current integral image into a plurality of views, each view of the views representing a perspective of a scene and from at least one image capture parameter associated with the image capture device,
selecting one view or a subset of the views, wherein the one or the subset are less than the total amount of the views,
coding said one view or said subset of the views among the plurality of views,
decoding said one view or said subset of the views by a view decoding module of said coding device,
recomposing partially the current integral image from said one decoded view or said subset of the decoded views by a view recomposition module of said coding device, by application of an inverse decomposition of said decomposition of the integral image and from said at least one image capture parameter associated with the image capture device,
determining a residual integral image by comparison of said at least one current integral image with said integral image which has been recomposed partially,
coding the data associated with the residual integral image and said at least one image capture parameter associated with the image capture device.

10. A method of decoding a data signal representing at least one current integral image acquired by an image capture device, said current integral image comprising a plurality of views and having previously been coded, comprising following acts performed by a decoding device:
identifying in the data signal at least one image capture parameter associated with the image capture device,
decoding one view or a subset of the views among said plurality of views of said current integral image by a view decoding module of said decoding device, from said at least one image capture parameter that has been identified, wherein the one view or the subset of the views are less than the total amount of the views, each of said one view or the subset of the views representing a perspective of a scene,
recomposing partially an integral image as predictor of the current integral image, by a view recomposition module of said decoding device, from said one decoded view or module of said decoding device, said subset of the decoded views and from said at least one image capture parameter associated with the image capture device,
decoding coded data representing the difference between said at least one current integral image and the integral image which has been recomposed partially,
reconstructing the current integral image from said partially recomposed integral image and decoded data representing said difference.

11. The decoding method as claimed in claim 10, in which a partial recomposition of said current integral image is implemented using a position parameter of said one decoded view or said subset of the decoded views in the current integral image to be decoded, said position parameter being predetermined or read in said data signal.

12. The decoding method as claimed in claim 10 in which:
the decoding of said one view or said subset of the views includes the execution of a dequantization step based on a first quantization parameter the value of which is identified in said data signal,
the decoding of the coded data representing the difference between said at least one current integral image and the partially recomposed integral image includes the execution of a dequantization step based on a second quantization parameter the value of which is identified in said data signal.

13. The decoding method as claimed in claim 10, further including an image modification based on a modification parameter that is predetermined or read in the data signal, said modification being applied:
between the decoding of said one view or subset of the said views and the partial recomposition of the current integral image as predictor of the current integral image, and/or
between the partial recomposition of the current integral image as predictor of the current integral image and the reconstruction of the current integral image.

14. A device for decoding a data signal representing at least one current integral image acquired by an image capture device, said current integral image comprising a plurality of views and having previously been coded, the decoding device comprising:
a processor, and
a non-transitory computer-readable medium comprising instructions stored thereon, which when executed by the processor configure the decoding device to perform acts comprising:
identifying in the data signal at least one image capture parameter associated with the image capture device,
decoding one view or a subset of the views among said plurality of views of said current integral image by a view decoding module of said decoding device, based on said at least one image capture parameter that has been identified, each of said one view or the subset of the views representing a perspective of a scene, wherein the one view or the subset of the views are less than the total amount of the views,
recomposing partially an integral image as predictor of the current integral image, by a view recomposition module of said decoding device, from said one decoded view or subset of the said decoded views and from said at least one image capture parameter associated with the image capture device,
decoding coded data representing the difference between said at least one current integral image and the integral image which has been recomposed partially,
reconstructing the current integral image from said partially recomposed integral image and decoded data representing said difference.

15. A non-transitory computer-readable data medium on which at least one series of program code instructions is stored for execution of a decoding method of decoding a data signal representing at least one current integral image acquired by an image capture device, said current integral image comprising a plurality of views and having previously been coded, when the instructions are executed by a processor of a decoding device, wherein the instructions configure the decoding device to perform acts comprising:
identifying in the data signal at least one image capture parameter associated with the image capture device,
decoding one view or a subset of the views among said plurality of views of said current integral image, by a view decoding module of said decoding device, from said at least one image capture parameter that has been identified, each of said one view or the subset of the views representing a perspective of a scene, wherein the one view or the subset of the views are less than the total amount of the views,
recomposing partially an integral image as predictor of the current integral image, by a view recomposition module of said decoding device, from said one decoded view or subset of the said decoded views and from said at least one image capture parameter associated with the image capture device,
decoding coded data representing the difference between said at least one current integral image and the integral image which has been recomposed partially,
reconstructing the current integral image from said partially integral image and decoded data representing said difference.

16. The coding method as claimed in claim 2, in which a number and a position of the one view or subset of the said views to be coded of the current integral image are selected as being those that optimize a predetermined coding performance criterion.

17. The coding method as claimed in claim 2, during which a selection of a value of a first quantization parameter to be applied is performed during the coding of said one view or subset of the said views and a selection of a value of a second quantization parameter to be applied is performed during the coding of the data associated with the residual integral image, said values being selected as optimizing a predetermined coding performance criterion.

18. The decoding method as claimed in claim 11, in which:
the decoding of said one view or said subset of the views includes the execution of a dequantization based on a first quantization parameter the value of which is identified in said data signal,
the decoding of the coded data representing the difference between said at least one current integral image and the partially recomposed integral image includes the execution of a dequantization based on a second quantization parameter the value of which is identified in said data signal.

19. The decoding method as claimed in claim 11, further including an image modification based on a modification parameter that is predetermined or read in the data signal, said modification being applied:
between the decoding of said one view or said subset of the views and the partial recomposition of the current integral image as predictor of the current integral image, and/or
between the partial recomposition of the current integral image as predictor of the current integral image and the reconstruction of the current integral image.

20. The decoding method as claimed in claim 12, further including an image modification based on a modification parameter that is predetermined or read in the data signal, said modification being applied:

between the decoding of said one view or said subset of the views and the partial recomposition of the current integral image as predictor of the current integral image, and/or between the partial recomposition of the current integral image as predictor of the current integral image and the reconstruction of the current integral image.

* * * * *